(12) United States Patent
Maeda et al.

(10) Patent No.: US 6,278,527 B1
(45) Date of Patent: *Aug. 21, 2001

(54) OUTPUT APPARATUS AND OUTPUT METHOD

(75) Inventors: Hiroyuki Maeda, Yokohama; Yuko Suga, Tokyo; Hiroshi Sugiyama, Yokohama; Akira Katayama, Yokohama; Akihiko Shimomura, Yokohama; Kazuhiro Nakajima, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,372

(22) Filed: Jan. 2, 1998

Related U.S. Application Data

(63) Continuation of application No. 08/363,960, filed on Dec. 27, 1994, now abandoned.

(51) Int. Cl.[7] .................................................. G06K 15/00
(52) U.S. Cl. .......................................... 358/1.15; 358/403
(58) Field of Search ..................... 358/400, 401, 358/405, 471, 403, 1.15; 379/67, 100.01, 101.01, 102.03

(56) References Cited

U.S. PATENT DOCUMENTS

| | | | |
|---|---|---|---|
| 4,876,610 | 10/1989 | Ohsawa et al. | 358/443 |
| 4,878,125 | 10/1989 | Katayama et al. | 358/443 |
| 4,958,218 | 9/1990 | Katayama et al. | 358/75 |
| 4,958,238 | 9/1990 | Katayama et al. | 358/456 |
| 4,975,786 | 12/1990 | Katayama et al. | 358/459 |
| 5,008,950 | 4/1991 | Katayama et al. | 382/50 |
| 5,068,746 | 11/1991 | Ohsawa et al. | 358/443 |
| 5,086,484 | 2/1992 | Katayama et al. | 382/50 |
| 5,086,487 | 2/1992 | Katayama et al. | 382/56 |
| 5,121,448 | 6/1992 | Katayama et al. | 382/57 |
| 5,138,672 | 8/1992 | Hirabayashi et al. | 382/54 |
| 5,157,741 | 10/1992 | Katayama | 382/54 |
| 5,170,388 | * 12/1992 | Endoh | 369/70 |
| 5,355,355 | 10/1994 | Oshima et al. | 369/14 |
| 5,450,211 | * 9/1995 | Kanai et al. | 358/401 |
| 5,467,437 | * 11/1995 | Fuse | 395/115 |
| 5,579,127 | * 11/1996 | Kaneko | 358/434 |
| 5,692,225 | * 11/1997 | Bernardi et al. | 396/318 |
| 5,861,890 | * 1/1999 | Sakai | 345/433 |

FOREIGN PATENT DOCUMENTS

| | | |
|---|---|---|
| 60-66382 | 4/1985 | (JP) . |
| 2-68396 | 5/1990 | (JP) . |

\* cited by examiner

*Primary Examiner*—Jerome Grant, II
(74) *Attorney, Agent, or Firm*—Fitzpatrick, Cella, Harper & Scinto (57) ABSTRACT

An output apparatus which produces the print output by saving in a first memory print data input via a two-way interface, and converting the print data into the print out information, comprising a second memory different from the first memory for saving the print data with a print ID number added which is input via the interface, a retrieving unit for retrieving corresponding print data of the second memory based on a print ID number input from the outside, and an output unit for outputting the retrieved print data converted into the print out information.

33 Claims, 12 Drawing Sheets

| FIG. 7A | FIG. 7B |

OUTPUT APPARATUS AND OUTPUT METHOD

This is a continuation of prior application Ser. No. 08/363,960 filed Dec. 27, 1994, abandoned on Dec. 10, 1997.

BACKGROUND OF THE INVENTION

1. Field of the Invention

The present invention relates to an output apparatus such as a printer which is connected via a two-way interface to an information equipment and an output method for use in said apparatus, and more particularly to an output apparatus for use in a field referred to as a multimedia, and an output method for use in said apparatus.

2. Related Background Art

Conventionally, in the recording apparatuses typically called a printer, by receiving a video signal or recording signal, a recording unit within a recording apparatus forms or records the image information on the recording medium, based on the recording signal or video signal.

For example, a video printer can record on the recording medium in such a way as to get one frame of moving picture or still picture displayed on the display or television screen as a video signal into a printer main unit and converting the video signal into a recording signal. Also, an output printer such as a computer or an electronic calculator can record on the recording medium in such a way as to get the information from the computer or electronic calculator as a recording signal into a printer main unit.

However, the conventional recording apparatuses as above mentioned, aiming to output the image information created by themselves or precreated image information directly and accurately, had a problem that the linkage or combination of recording signal and audio signal or video signal might be delayed under the so-called multimedia environment where all the information is integrated.

SUMMARY OF THE INVENTION

In the light of the above-mentioned problem, it is an object of the present invention to provide an output apparatus of recording signal and an output method in said apparatus, which is capable of implementing the linkage or combination of the recording signal and the audio signal or video signal by allowing the recording signal and the audio signal or video signal to be dealt with independently without confusion even if data is provided in a media having the recording signal and the audio signal or video signal mixed.

To accomplish the above object, there is provided an output apparatus according to the invention which saves in first memory means print data which is input via a two-way interface, and converts said print data into the print out information to produce the print output, comprising second memory means which is different from said first memory means for memorizing said print data which is input via said interface, with a print ID number added, retrieving means for retrieving corresponding print data of said second memory means, based on a print ID number which is input from the outside, and output means for outputting said retrieved print data which is converted into the print out information.

To accomplish the above object, there is provided an output method of the output apparatus according to the invention which saves in first memory means print data which is input via a two-way interface, and converts said print data into the print out information to produce the print output, including inputting said print data with a print ID number added via said interface, memorizing said print data in second memory means which is different from said first memory means, retrieving corresponding print data of said second memory means, based on a print ID number which is input from the outside, and outputting said retrieved print data which is converted into the print out information.

Further, the present invention has preferably said print data which is supplied from an audio media such as a compact disk or a video media such as a laser disk, or a computer associated media or a digital information media such as a CD-ROM and a CD-I.

Further, the present invention has preferably said print data which is compressed and saved with a print ID number added at a leader section of said each media in a common recording format and a common compressed format, with an area distinguishing/recognizing signal, which is different from other information signals, inserted at least before and after a print data area.

Further, the invention comprises preferably said second memory means which saves said compressed and input print data which is expanded using means for expanding said compressed print data, wherein said print data is retrieved from said memory unit B, based on a print ID number which is input, by said retrieving means, and converted into the print out information to obtain the print output.

Further, the invention comprises preferably said second memory means which saves said input print data in compressed state, wherein said print data of said second memory means is retrieved by said retrieving means, based on a print ID number which is input by means for inputting said print ID number, and said print data is expanded using means for expanding compressed print data and converted into the print out information to obtain the print output.

Further, the invention has preferably the print data of said second memory means which is managed in terms of said print ID number.

Further, the invention has preferably the print data of said second memory means which is held until a designated instruction is entered.

In the invention, with the above configuration, the recording signal and the audio signal or video signal can be independently dealt with without confusion, even if data is provided in a media having the recording signal and the audio signal or video signal mixed. Therefore, the linkage or combination of the recording signal and the audio signal or video signal can be implemented.

BRIEF DESCRIPTION OF THE DRAWINGS

FIG. 7 is comprised of FIGS. 7A and 7B showing a flowchart illustrating a processing procedure in a system configuration according to an embodiment of the invention.

FIG. 8 is comprised of FIGS. 8A and 8B showing a flowchart illustrating a processing procedure in another system configuration according to another embodiment of the invention.

FIG. 9 is comprised of FIGS. 9A and 9B showing a flowchart illustrating a processing procedure in a further system configuration according to another embodiment of the invention.

DESCRIPTION OF THE PREFERRED EMBODIMENT

The preferred embodiments of the present invention will be described below with reference to the drawings.

First, the constitution of a laser beam printer and an ink jet printer suitable for applying the invention will be described with reference to FIGS. 1 to 3. It should be noted that the printer to apply the invention is not limited to the laser beam printer and the ink jet printer, but may be printers of other printing system.

Figure 1:
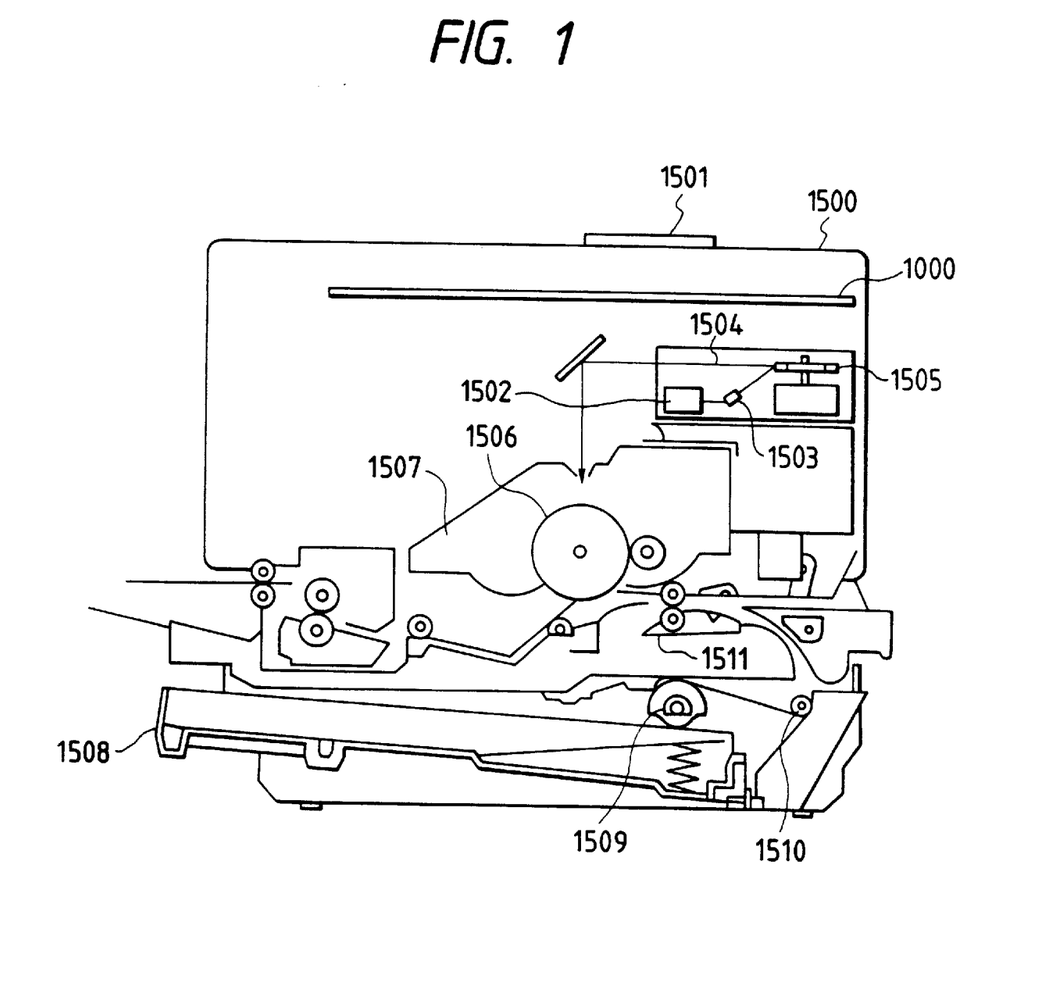
FIG. 1 is a cross-sectional view showing the constitution of a first output apparatus (laser beam printer) to which the invention is applicable.

FIG. 1 is a cross-sectional view showing the constitution of a first output apparatus to which the invention is applicable, for example, in a case of a laser beam printer (LBP).

In FIG. 1, 1500 is an LBP for forming the image on a recording paper which is a recording medium in such a way as to input and memorize the print information (character code) or the form information or macro instruction supplied from a host computer or video recorder connected externally, and create corresponding character pattern or form pattern in accordance with such information. 1501 is an operation panel having the switches for operation and the LED displays arranged thereon, and 1000 is a printer control unit for controlling the whole LBP main unit 1500 and analyzing the character information supplied from the host computer. This printer control unit 1000 converts the character information into a video signal of corresponding character pattern which is output to a laser driver 1502. The laser driver 1502 is a circuit for driving a semiconductor laser 1503, which switches on or off a laser beam 1504 emitted from the semiconductor laser 1503 in accordance with the input video signal.

The laser beam 1504 scans over an electrostatic drum 1506 while being deflected by a rotational polygon mirror 1505 to the left and right. As a result, an electrostatic latent image of character pattern is formed on the electrostatic drum 1506. This latent image is transferred onto the recording paper after being developed by a developing unit 1507 disposed on the periphery of the electrostatic drum 1506. The recording paper used herein is a cut sheet, wherein cut sheet recording papers are contained within a paper cassette 1508 attached on the LBP 1500, one recording paper being brought into the apparatus by means of a paper supply roller 1509, and paper feed rollers 1510, 1511, and supplied to the electrostatic drum 1506. Also, the LBP main unit 1500 is provided with at least one or more card slots, not shown, allowing for the connection of an option font card which is optionally provided in addition to a contained font, and a control card (emulation card) involving a different printer language system.

Figure 2:
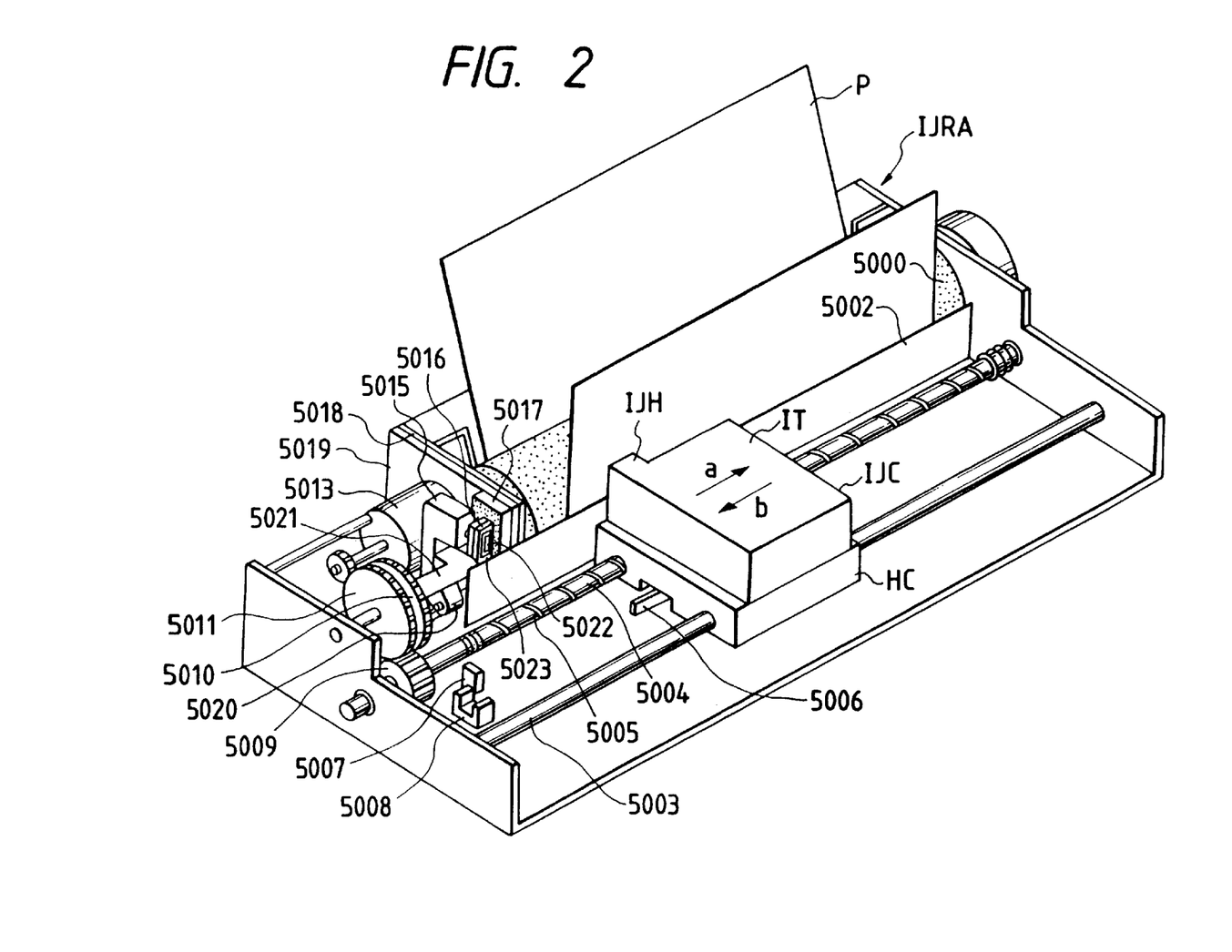
FIG. 2 is a perspective view showing the constitution of a second output apparatus (ink jet printer) to which the invention is applicable.

FIG. 2 is a perspective view showing the appearance and constitution of a second output apparatus to which the present invention is applicable, for example, in a case of an ink jet recording apparatus (IJRA).

In FIG. 2, a carriage HC engaging a helical groove 5004 of a lead screw 5005 rotating via the driving force transmission gears 5011, 5009, along with the forward or backward rotation of a drive motor 5013, has a pin (not shown), and is moved reciprocally in the directions of the arrow a, b. This carriage HC has an ink jet cartridge IJC mounted thereon. 5002 is a paper presser plate for pressing the paper against a platen 5000 along the carriage moving direction. 5007, 5008 are photo-couplers for confirming the existence of a carriage lever 5006 in this region to function as home position sensing means in switching the rotation direction of a motor 5013. 5016 is a member for supporting a cap member 5022 for capping the entire face of a recording head, and 5015 is suction means for sucking the inside of this cap to make a suction recovery of the recording head via a cap inside opening 5023. 5017 is a cleaning blade which is movable back and forth by a member 5019. 5018 is a main body support plate for supporting 5017, 5019 as above cited. 5012 is a lever for starting the suction of suction recovery, this lever being moved with the movement of a cam 5020 engaged with the carriage so that the driving force from the drive motor is controlled for movement by well-known transmission means such as clutch switching means.

These capping, cleaning and suction recovery are configured to perform their desired processings at corresponding locations under the action of the lead screw 5005, when the carriage comes to an area on the home position side, but may be configured to perform their desired operations at known timings.

Figure 3:
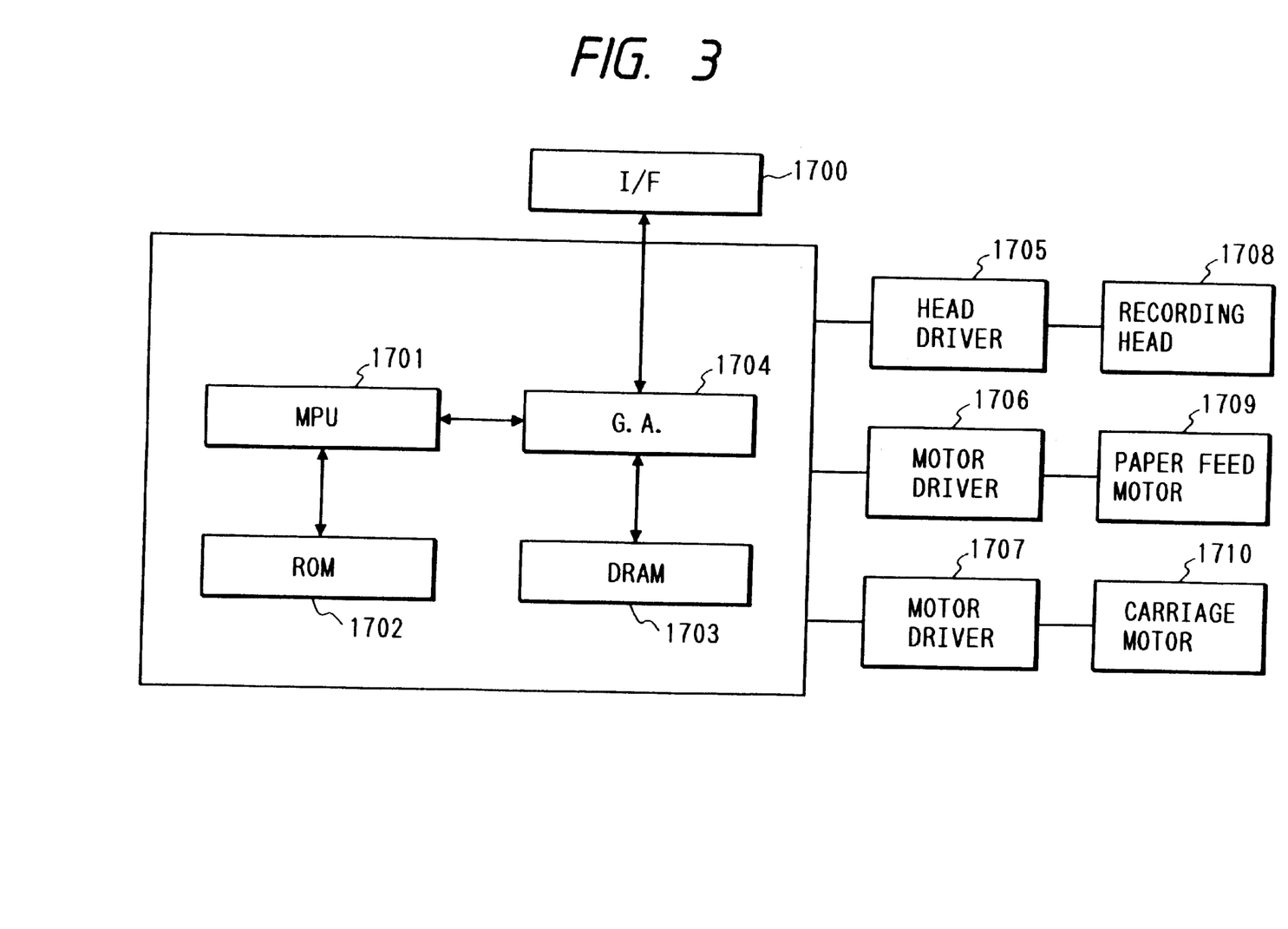
FIG. 3 is a block diagram showing the configuration of a control system of the second output apparatus as shown in FIG. 2.

FIG. 3 is a block diagram for explaining the control configuration of the second output apparatus as shown in FIG. 2.

In FIG. 3, 1700 is a two-way interface for the input of recording signal or recording information, 1701 is an MPU, 1702 is a ROM for storing the control program which the MPU 1701 executes or the host print information, and 1703 is a DRAM (dynamic RAM) for storing a variety of kinds of data (the recording signal or recording data to be supplied to the head). 1704 is a gate array for controlling the output data supplied to the recording head 1708, as well as controlling the transfer of data between the two-way interface 1700, the MPU 1701 and the DRAM 1703. 1710 is a carrier motor for conveying the recording head 1708, 1709 is a paper feed motor for feeding the recording paper, 1705 is a head driver for driving the recording head, 1706 is a motor driver for driving the paper feed motor 1709, and 1707 is a motor driver for driving the carrier motor 1710.

In the recording apparatus as above constituted, if the input information is passed via the two-way interface 1700 from the host computer 100 or video recorder (not shown), the input information is converted into the print out information between the gate array 1704 and the MPU 1701. And while the motor drivers 1706, 1707 are driven, the recording head is driven in accordance with the output information sent to the head driver 1705 for the printing.

Note that the MPU 1701 can perform the communication processing with the host computer 100 via the two-way interface 1700, as will be described later, wherein the memory information or resouce data regarding the DRAM 1703 or the host print information within the ROM 1702 can be informed to the host computer, as will be described later. Also, the MPU 1701, when connected via the two-way interface 1700 to the video recorder (not shown), can perform the image processing of image information which is entered into the DRAM 1703.

Figure 4:
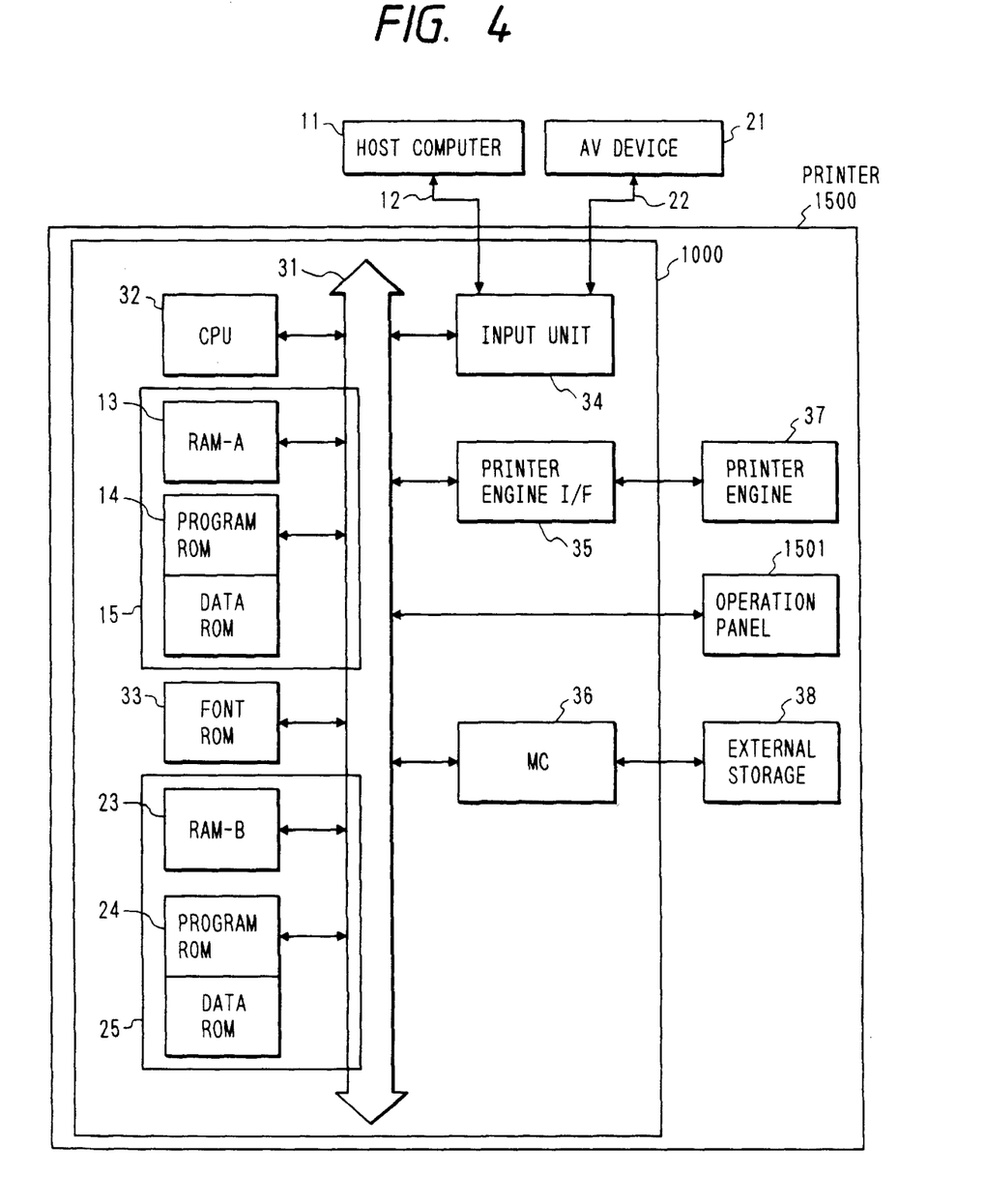
FIG. 4 is a block diagram showing the configuration of a printer control system according to one embodiment of the invention.

FIG. 4 is a block diagram showing the configuration of a printer control system of the output apparatus in an example of the invention. Herein, a laser beam printer (FIG. 1) is exemplified.

In FIG. 4, 1500 is a printer main unit. The recording information from the host computer 11 is connected via the two-way interface 12 to an input unit 34 of the printer 1500, and the recording information from an AV (audio visual) device 21 is connected via a one-way interface 22 to the input unit 34 of the printer 1500. 32 is a printer CPU (microprocessor) for controlling globally the access to a variety of types of devices connecting via a system bus 31, based on the control program stored in a program ROM of a ROM 14 in a group 15, the control program stored in a program ROM of a ROM 24 in a group 25, or the control program stored in an external memory 38, so that the image signal as the output information may be output to a printer unit (printer engine) connected via a printer engine interface 35.

Figure 5:
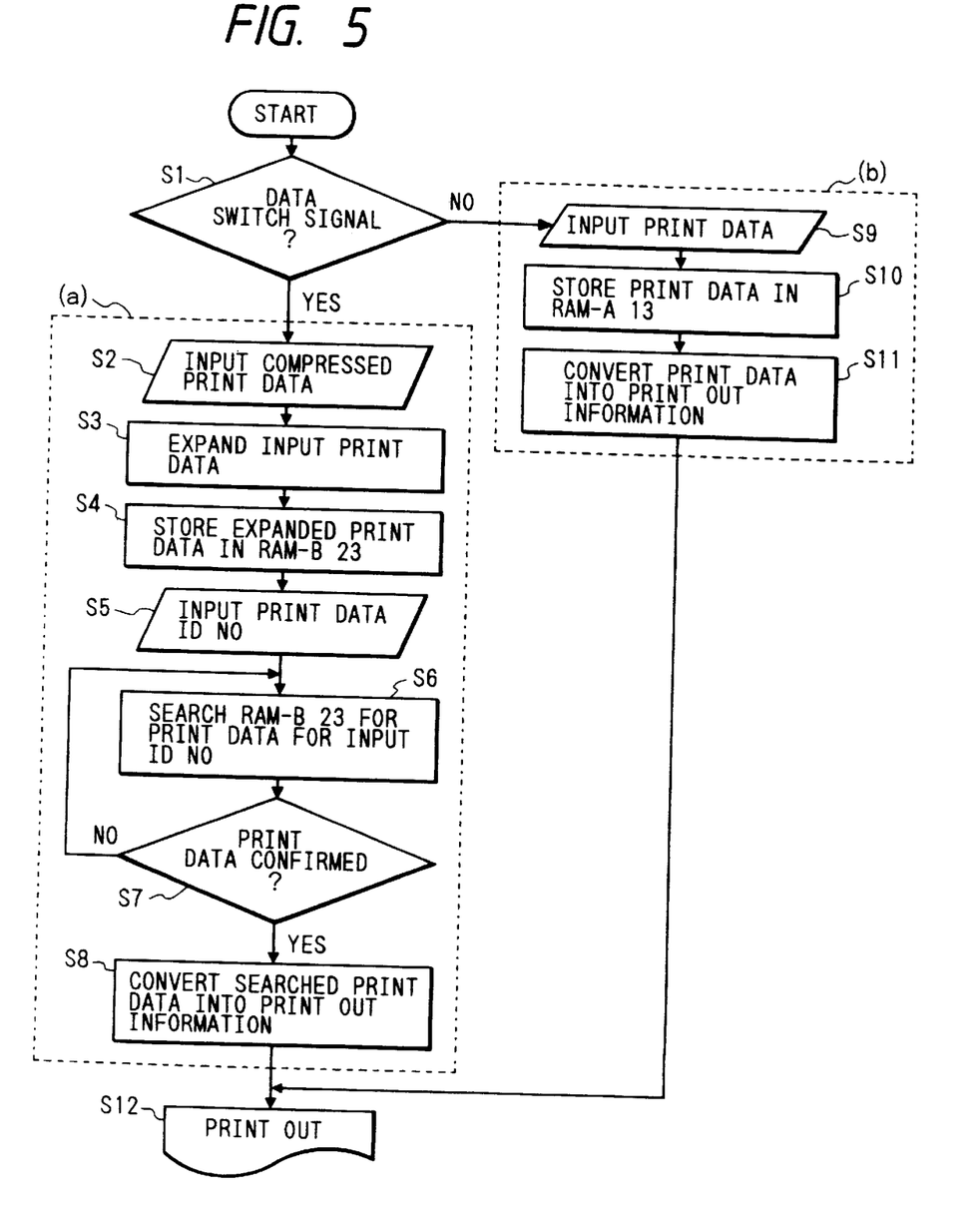
FIG. 5 is a flowchart showing the flow of a typical operation procedure of the printer control system according to the embodiment of the invention.

The group 15 is a conventional control unit for controlling the print output, the program ROM of ROM 14 storing the control program of the CPU 32 as shown in a flowchart (b) of FIG. 5. A font ROM 33 stores the font information (dot font or outline font) for use in creating the output information (bit map data), and a data ROM of ROM 14 stores the information useful on the host computer, when the printer has no external memory 38 such as a hard disk.

The group 25 is a control unit for controlling the print output in the example of the invention, the program ROM of ROM 24 storing the control program of CPU 32 as shown in a flowchart (a) of FIG. 5. The font ROM 33 stores the font information (dot font or outline font) for use in creating the output information, and a data ROM of ROM 24 stores the information useful on the host computer, when the printer has no external memory 38 such as a hard disk.

The CPU 32 can perform the signal processing with the host computer 11 via the input unit 34, wherein the information inside the printer can be informed to the host computer 11. Note that a RAM-A13 and a RAM-B23 are usable for a print data memory area, an output information (bit map data) development area, an environmental data storing area, and an NVRAM (nonvolatile RAM). Further, the RAM-B23 is provided with an output information holding area. The external memory 38 such as a hard disk or an IC memory is controlled for access by a memory controller (MC) 36. The external memory 38 may be optionally connected to store the font data, the emulation program, and the form data. Also, 1501 is an operation panel having the switches for operation and the LED (light emitting diode) indicators arranged thereon.

It will be appreciated that the number of external memories as above mentioned is not limited to only one, as above described, but may be at least one or more, wherein an option font card provided in addition to a contained font or a plurality of external memories storing the programs for interpreting the printer control languages of different printer language systems may be connected. Further, an NVRAM, not shown, may be provided to store the printer mode setting information which is input from the operation panel 1501.

In the printer control system as above constituted, the flow of a typical processing operation in the example of the invention will be described with reference to a flowchart of FIG. 5. The print data (composed of the character code or the control code) input from the host computer 11 via the two-way interface 12 into the input unit 34 of the printer 1500 is checked by the CPU 32 to determine whether or not the top data thereof is a data switch signal (S1). If it is not the data switch signal, the print data is passed to the flow (b) which is identical to the flow of the conventional print output control (S9), and saved in a print data memory area of RAM-A13 (S10). Then, the print out information is generated using the print information (S11), and printed (S12). If it is the data switch signal, the print data is passed to the flow (a) which is the print output flow in the example of the invention.

The print data following the data switch signal is compressed print data (S2). The compressed print data is expanded and stretched (S3), and saved in a RAM-B23 which is managed for each print data ID number (S4). A print data ID number is input from the host computer 11 or the operation unit 1501 (S5), and print data corresponding to its number is retrieved from the print data saved in the RAM-B23 by the CPU 32 (S6, S7).

The retrieved print data is converted into the print out information (bit map data) in accordance with the control flow as previously described (S8), and sent to the printing unit 37 to obtain the print output (S12).

Also, the print data from the AV device 21 via the two-way interface 22 into the input unit 34 of the printer 1500 is necessarily passed to the flow (a) which is a print output flow in the example of the invention, without the CPU 32 checking to see whether or not the top data is a data switch signal. Then, the compressed print data is expanded and stretched, and saved in a RAM-B23 which is managed for each print data ID number. A print data ID number is input from the operation unit 1501, and print data corresponding to its number is retrieved from the print data saved in the RAM-B23 by the CPU 32. The retrieved print data is converted into the print out information in accordance with the control flow as previously described, and sent to the printing unit 37 to obtain the print output. Here, print data saved in the RAM-B23 is held unless new data is input or a delete instruction is input intentionally.

Figure 6:
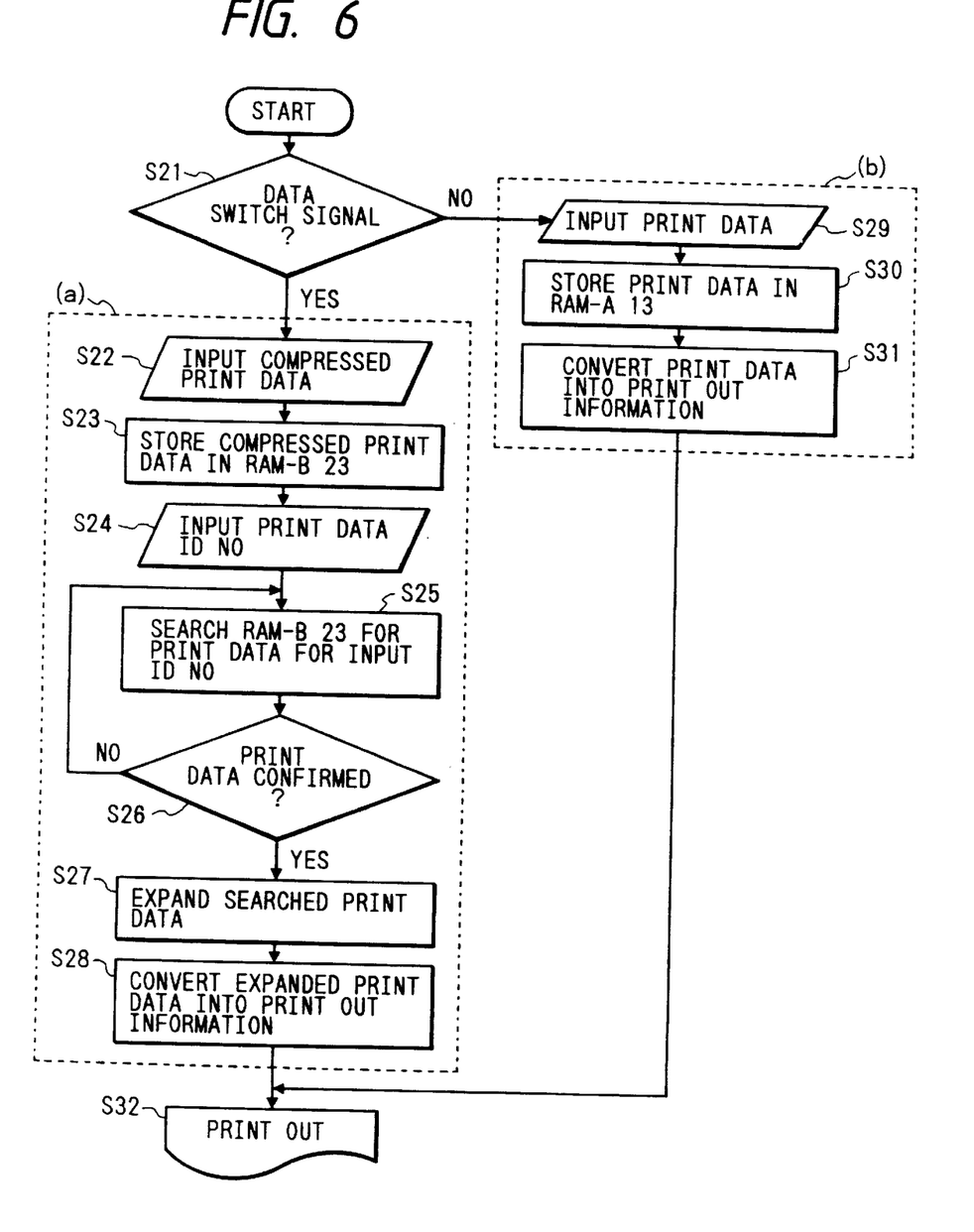
FIG. 6 is a flowchart showing the flow of a typical operation procedure of another printer control system according to another embodiment of the invention.

FIG. 6 shows a typical flowchart in another example of the invention. A different point from FIG. 5 is that compressed print data which is input from the input unit 34 (S22) is saved in a RAM-B23 managed for each print data ID number in compressed state (S23). A print data ID number is input from the host computer 11 or the operation unit 1501 (S24), and print data corresponding to its number is retrieved from the print data saved in the RAM-B23 by the CPU 32 (S25, S26).

The retrieved print data is expanded and stretched (S27), converted into the print out information in accordance with the control flow as previously described (S28), and sent to the printing unit 37 to obtain the print output (S32). Here, print data saved in the RAM-B23 is held unless new data is input or a delete instruction is input intentionally.

Figures 7, 7A:
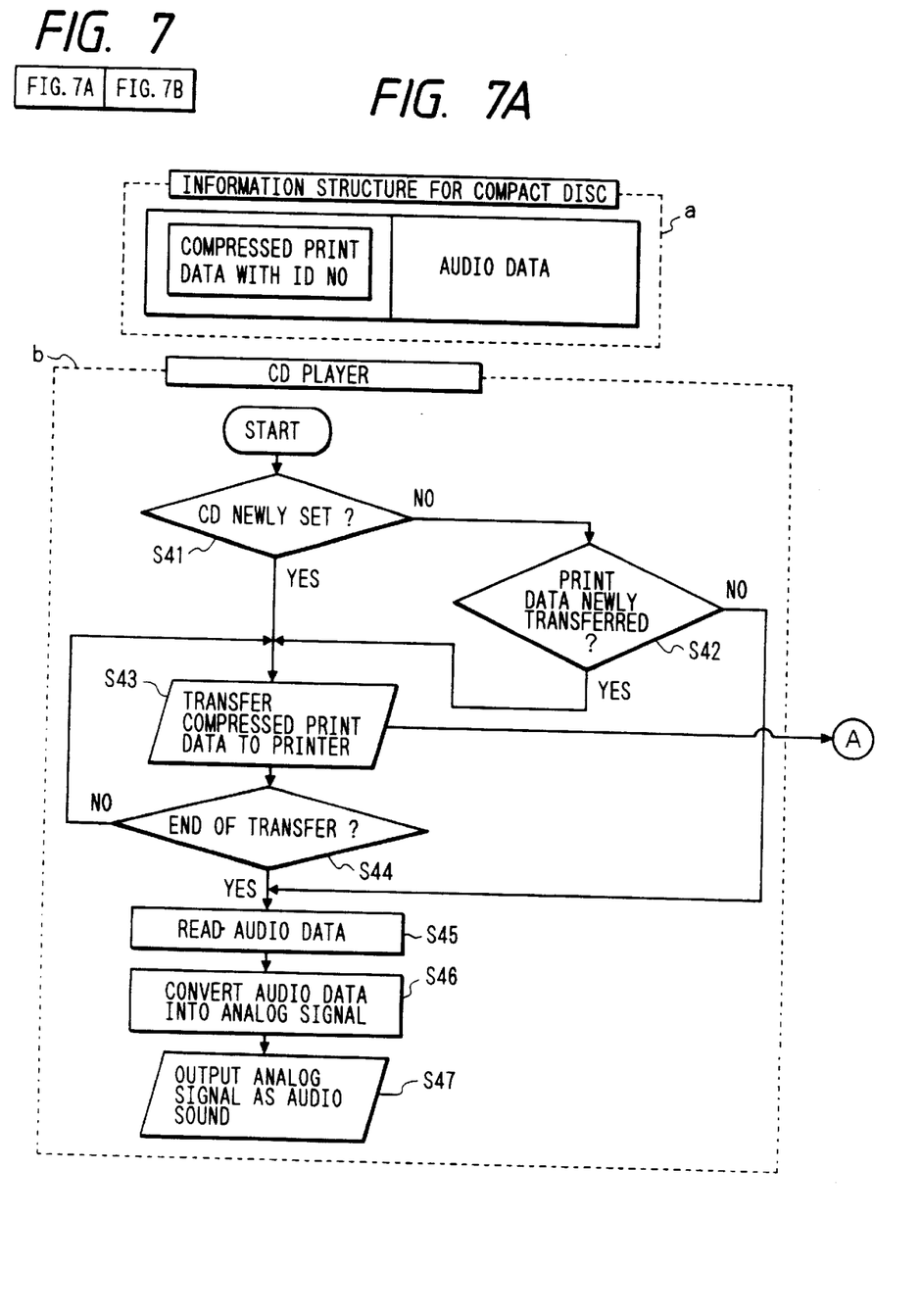
Figure 7B:
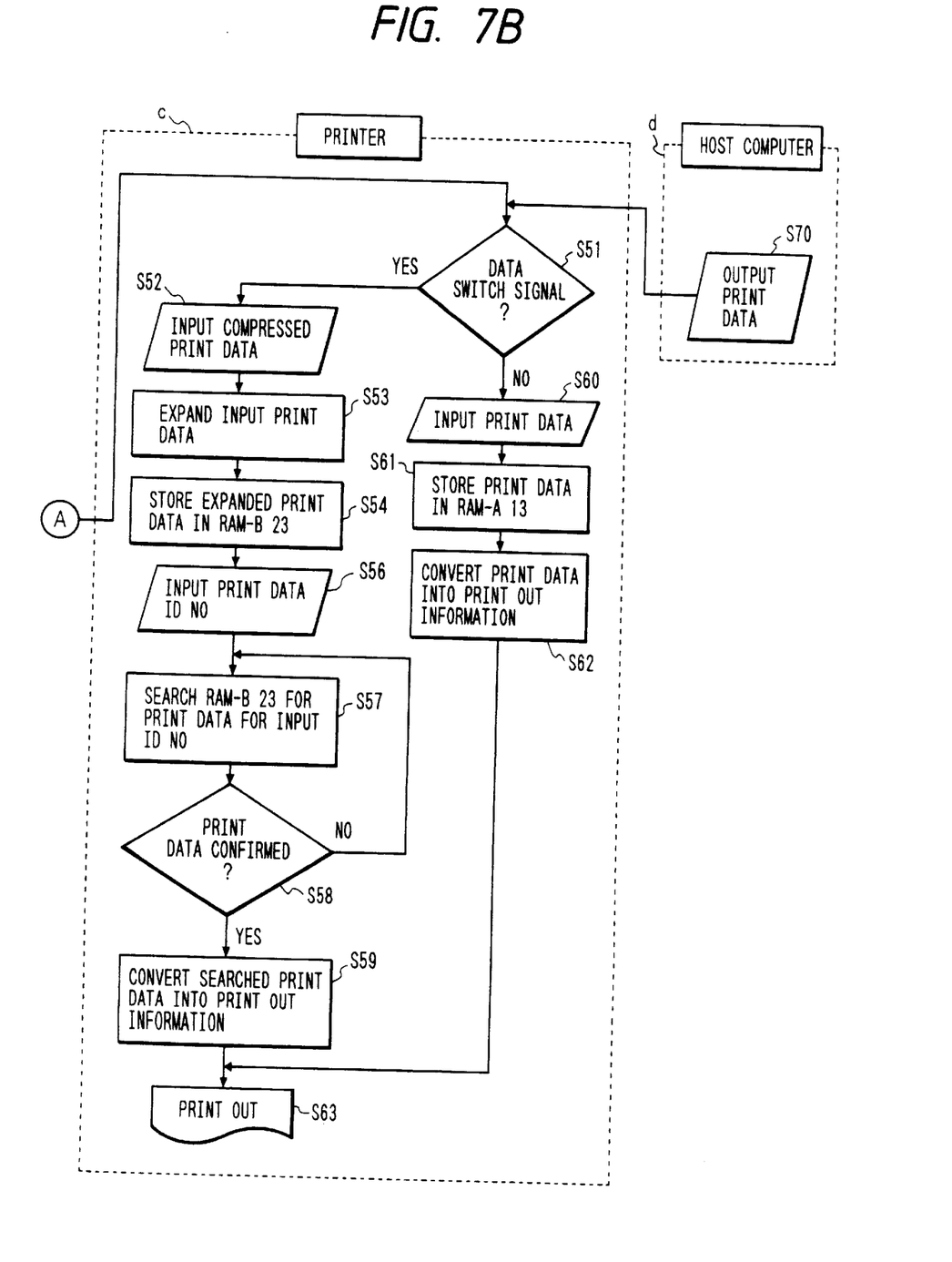

FIGS. 7A and 7B show a detailed processing procedure in the example of the invention, wherein the a part shows schematically the information structure for a compact disk. Print data is compressed and saved with an ID number added in the leader section of audio data. The b part, the c part and the d part show schematically the flows of a compact disk player (AV device 21), a printer 1500 according to the invention, and a host computer 11, respectively.

First, a compact disk a is set on a compact disk player b (AV device 21). Upon starting the compact disk player b, if it is confirmed that the compact disk a has been newly set (S41), compressed print data in the leader section is transferred to the printer c (printer 1500) (S43). After the end of transfer (S44), audio data is read from the compact disk a which has been set (S45), converted into analog signal (S46), and output as audio sound through a speaker (S47). Herein, when there is no compressed print data in the leader section, audio data is immediately read, converted into analog signal and output as audio sound through the speaker.

Also, if the compact disk a has been already set (S41), a selection of whether to transfer newly print data to the printer c (printer 1500) can be made (S42). A command for this selection can be entered from the operation panel of the compact disk player b (AV device 21).

The printer c (printer 1500) determines whether or not the input print data is sent from the compact disk player b or from the host computer d (S51). After it is determined that the print data is sent from the compact disk player b, the input compressed print data is expanded and stretched (S52, S53), and saved in the memory unit (RAM-B23) (S54). Herein, the listener listening to a music (audio data) of this compact disk a, who wants to obtain the information concerning the music, for example, a profile of the musician or a sheet of music, must input a prespecified ID number of print data from the operation panel of the printer main unit c (printer 1500) (S56). The printer main unit retrieves print data from the print data group within the memory unit, based on the input ID number (S57, S58), converts this retrieved print data into the print out information (bit map data) (S59), and outputs the print (S63). Thereby, the listener can obtain print information which is different from audio information to which the listener is listening with an audio equipment.

On the other hand, after it is determined that the print data is sent from the computer 11, the input print data is saved in the memory unit (RAM-A13) (S60, S61), converted into the print out information (S62), and output (S63).

Figures 8, 8A:
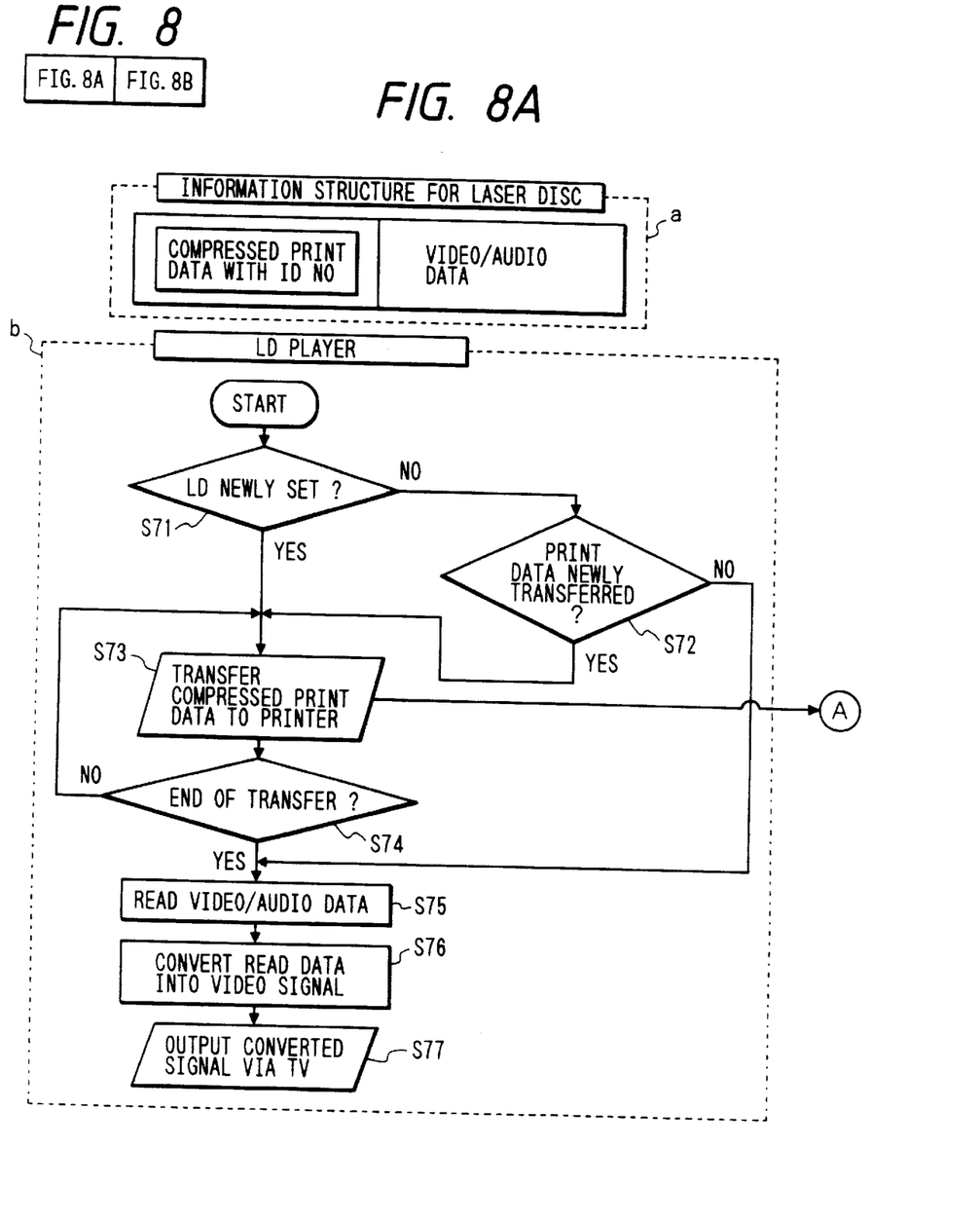
Figure 8B:
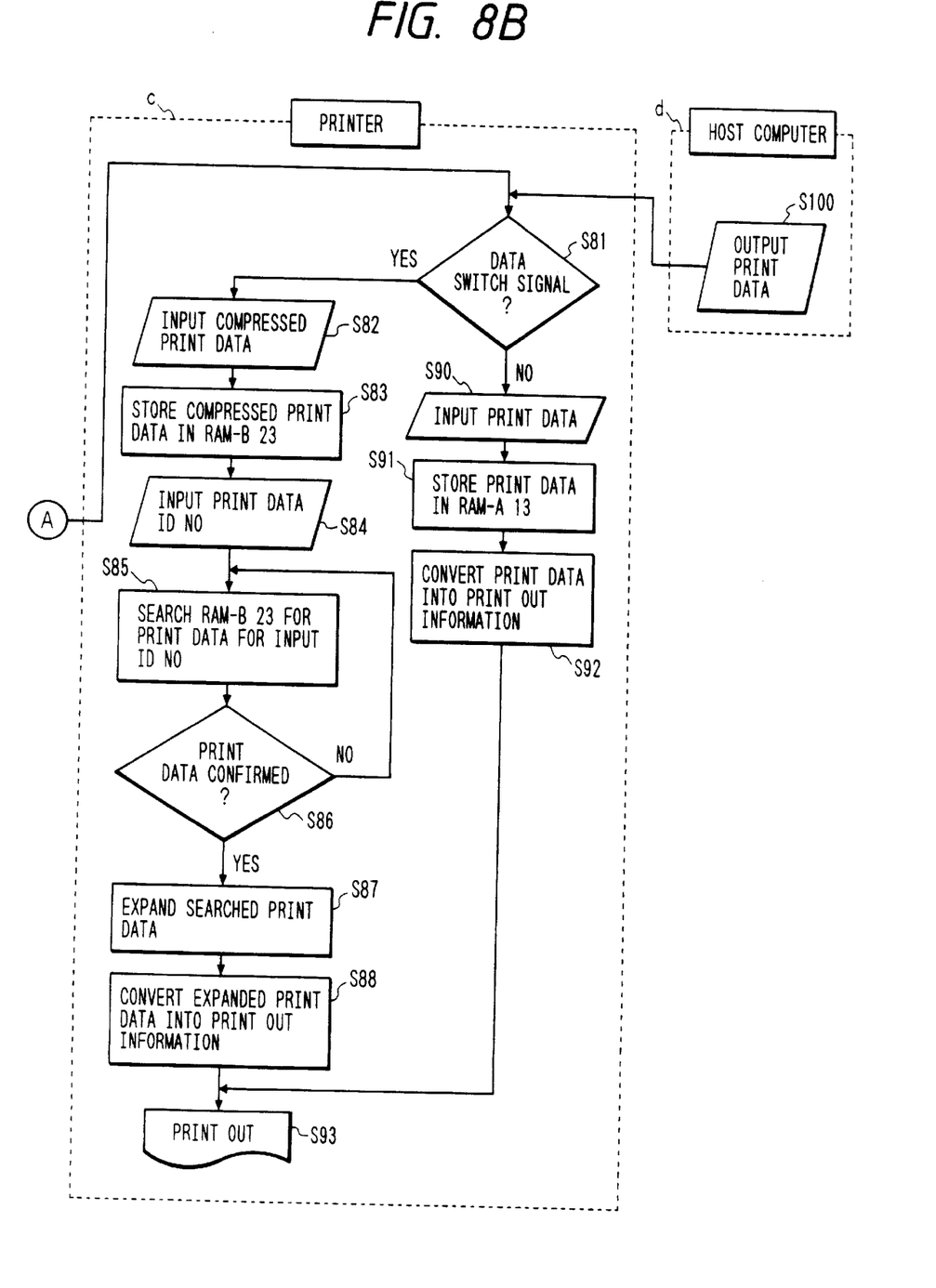

FIGS. 8A and 8B show a detailed processing procedure in another example of the invention, wherein the a part shows schematically the information structure of a laser disk. Print data is compressed and saved with an ID number added in the leader section of video (image)/audio data. The b part, the c part and the d part show schematically the flows of a laser disk player, a printer according to the invention, and a computer, respectively.

First, a laser disk a is set on a laser disk player b (AV device 21). Upon starting the laser disk player b, if it is confirmed that the laser disk a has been newly set (S71), compressed print data in the leader section is transferred to the printer c (printer 1500) (S73). After the end of transfer (S74), video/audio data is read (S75), converted into video signal (S76), and output as video/audio through a television (S77). Herein, when there is no compressed print data in the leader section, video/audio data is immediately read, converted into video signal and output as video/audio through the television. Also, if the compact disk a has been already set, a selection of whether to transfer newly print data to the printer c can be made (S72). A command for this selection can be entered from the operation panel of the laser disk player b (AV device 21).

The printer c determines whether or not the input print data is sent from the laser disk player b or from the host computer d (S81). After it is determined that the print data is sent from the laser disk player b, the compressed print data is saved in the memory unit (RAM-B23) (S82, S83). Herein, the viewer seeing a video of this laser disk, who wants to obtain the information concerning this video, for example, a profile of the actor or actress or film studio information or a scenario, must input a prespecified ID number of print data from the operation panel of the printer main unit c (S84). In the printer main unit c, print data is retrieved from the print data group within the memory unit, based on the input ID number (S85, S86), expanded and stretched (S87), converted into print out information (bit map data) (S88), and output (S93). Thereby, the viewer can obtain print information which is different from video information which the viewer is seeing on the television.

On the other hand, after it is determined that the print data is data from the computer d, the input print data is saved in the memory unit (RAM-A13) (S90, S91), converted into the print out information (S92), and output (S93).

Figures 9, 9A:
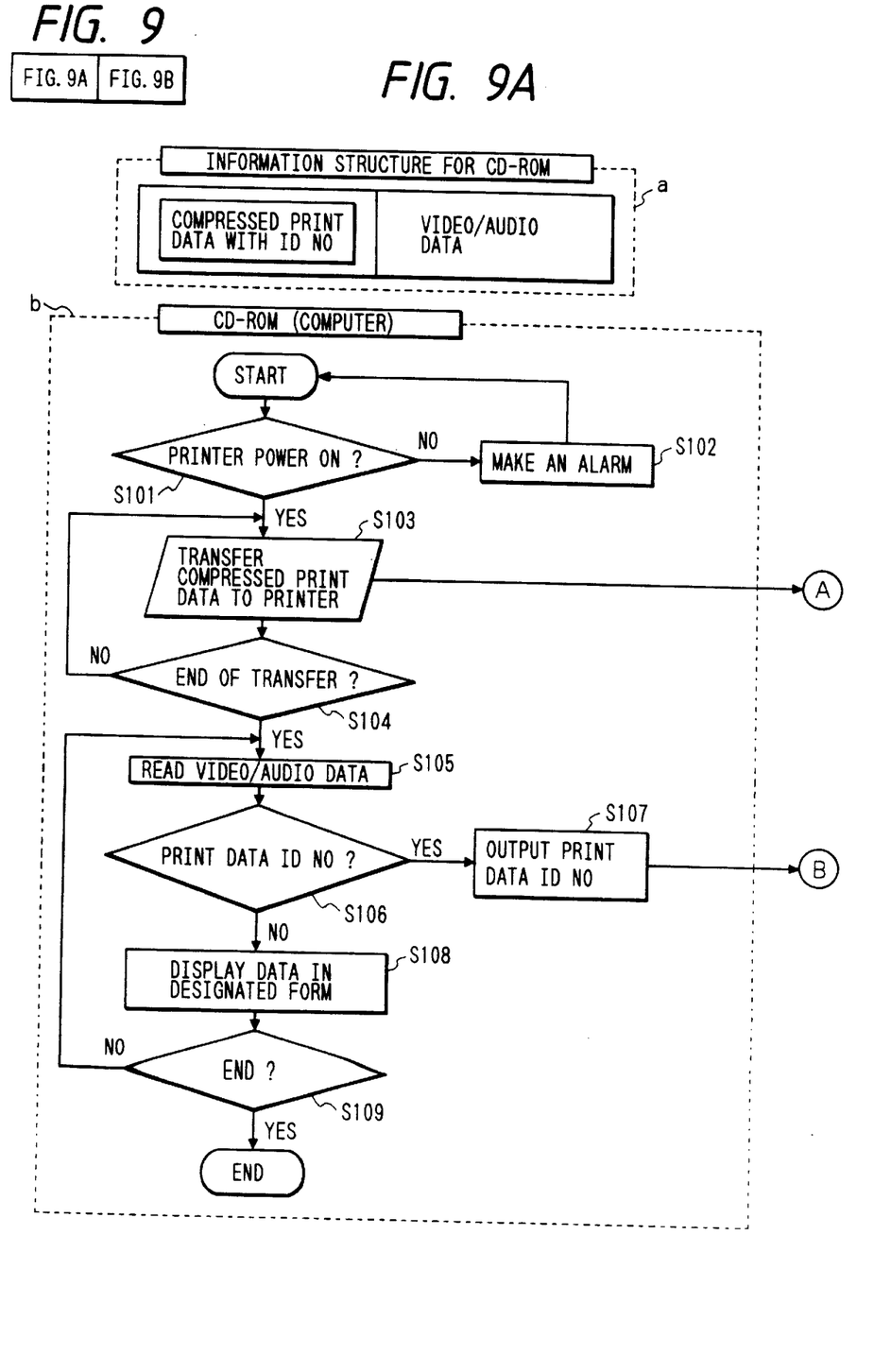
Figure 9B:
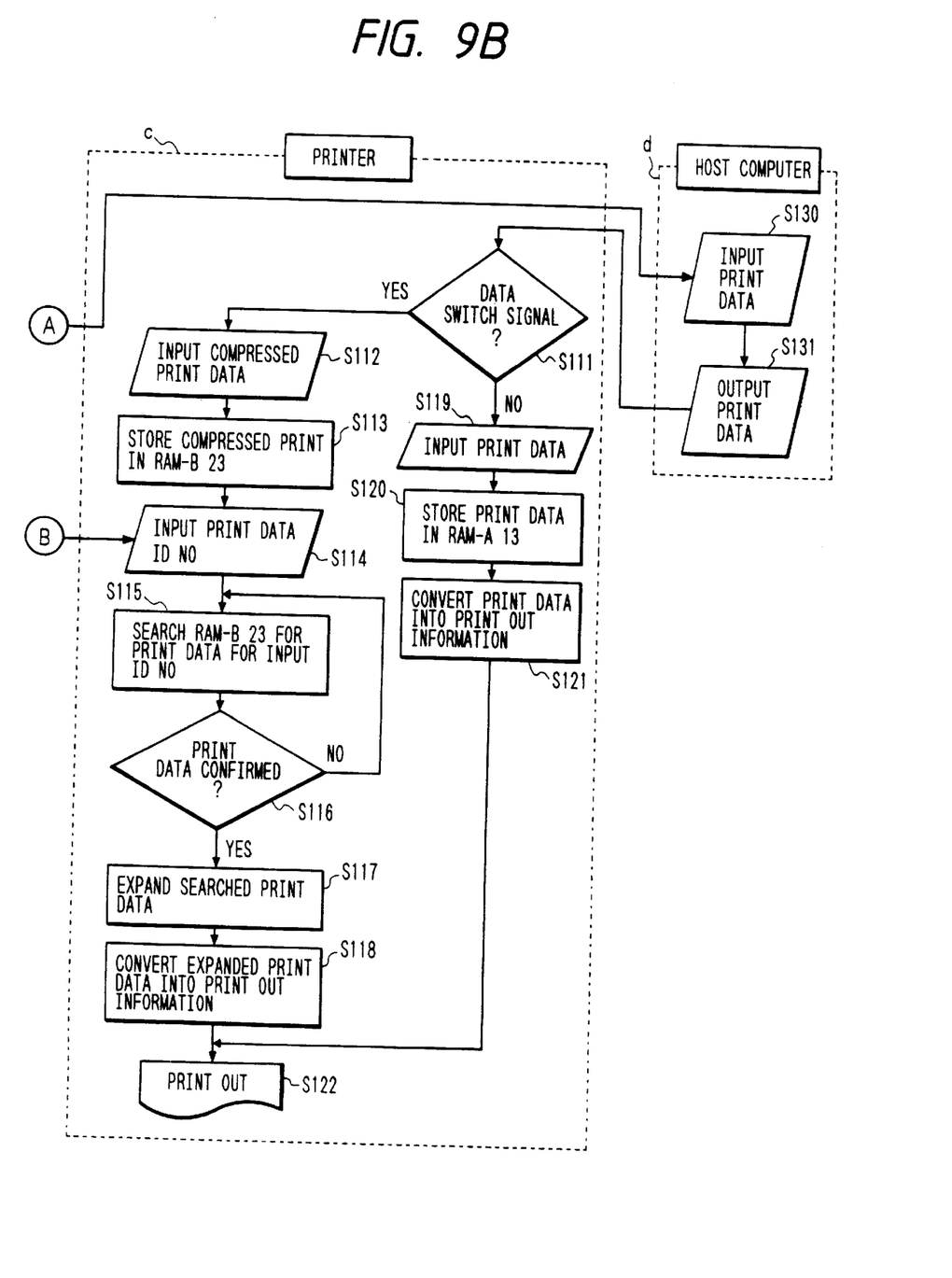

FIGS. 9A and 9B show a processing procedure in a third example of the invention, wherein the part shows schematically the information structure of a CD-ROM. Print data is compressed and stored with an ID number added in the leader section of video (image)/audio data. The b part, the c part and the d part show schematically the flows of a CD-ROM drive unit, a printer according to the invention, and a host computer connected to the CD-ROM drive unit, respectively.

First, a CD-ROM a is set on a CD-ROM drive unit b (AV device 21). Upon starting the CD-ROM drive unit, if it is confirmed that the printer is connected to the host computer d and the power of printer is on (S101), compressed print data in the leader section is transferred via the host computer d to the printer c. After the end of transfer, video/audio data is read, and transferred to the computer d (S103, S130, S131). Herein, when there is no compressed print data in the leader section, video/audio data is immediately read, and transferred to the host computer d.

The printer c determines by itself whether or not the input print data is sent from the CD-ROM drive unit b via the host computer or from the host computer d (S111). After it is determined that the print data is sent from the CD-ROM drive unit b, the compressed print data is saved in the memory unit (RAM-B23) (S112, S113). Herein, the person playing a game, for example, by controlling or processing the video/audio data on the host computer d, who wants to obtain the information concerning this game, for example, a manual of the game, must input a prespecified ID number of print data from the operation panel of the printer main unit c or the host computer d (S105 to S109, S114). Or an ID number of print data may be interposed intentionally in the video/audio data from the CD-ROM a to input the ID number via the host computer into the printer main unit c. In the printer main unit, print data is retrieved from the print data group within the memory unit based on the input ID number (S115, S116), expanded and stretched (S117), converted into print out information (bit map data) (S118), and output (S122). The operator working on the host computer can thereby obtain print information which is different from image information appearing on the screen of host computer.

(Others)

Note that the media for supplying the print data is not limitative to the compact disk, the laser disk, and the CD-ROM, as above cited, as far as the present invention can be carried out. The connecting relation between the device for driving this media and the printer or host computer is not limited to those of the above-mentioned examples, as far as the present invention can be carried out, but may be in a form in which all components are integrated.

As described above, with the above examples, it is possible to provide an output apparatus of recording signal and an output method in said apparatus, which is capable of implementing the linkage or combination of the recording signal and the audio signal or video signal in such a way that the recording signal and the audio signal or video signal can be dealt with independently without confusion even if data is provided in a media where the recording signal and audio signal or video signal are mixed.

What is claimed is:

1. A print system including an output apparatus, a printer and a video or audio output apparatus, wherein said output apparatus comprises:

a print data transfer unit arranged to read, from a storage medium which stores (a) at least one piece of print data each having a print ID and (b) video or audio data, the at least one piece of print data and to execute a data transfer process to transfer the at least one piece of print data to said printer;

a transfer discriminator arranged to discriminate whether said print data transfer unit has completed the data transfer process;

a data read unit arranged to read the video or audio data from the storage medium, if said transfer discriminator discriminates that said data transfer unit has completed the data transfer process;

an ID detection unit arranged to detect a print ID in the video or audio data read by said data read unit;

an ID transfer unit arranged to transfer the print ID if said ID detection unit detects the print ID in the read video or audio data; and a video or audio data transfer unit arranged to transfer the video or audio data read by said data read unit to said video or audio output apparatus, wherein said printer comprises:

a memory unit arranged to store the at least one piece of print data received from said print data transfer unit; and a print unit arranged to execute a printing process based on one of the at least one piece of print data stored in said memory unit, the one piece of print data having a print ID corresponding to the print ID received from said ID transfer unit, and wherein said video or audio output apparatus comprises:

an output unit arranged to execute a video or audio output process based on the video or audio data received from said video or audio data transfer unit.

2. A system according to claim 1, wherein said memory is arranged to store the at least one piece of print data received from said print data transfer unit such that the print data is managed for each print ID.

3. A system according to claim 1, wherein the at least one piece of print data is stored in the leader section of the storage medium.

4. A system according to claim 1, wherein the at least one piece of print data is provided in a compressed form and expanded and printed based on the print ID received from said ID transfer unit.

5. A print system including an output apparatus, a printer and a video or audio output apparatus, wherein said output apparatus comprises:

a data read unit arranged to read video or audio data from a storage medium;

a print information detection unit arranged to detect print information in the video or audio data read by said data read unit;

a print information transfer unit arranged to transfer the print information to said printer, if said print information detection unit detects the print information in the read video or audio data; and a video or audio data transfer unit arranged to transfer the video or audio data read by said data read unit to said video or audio output apparatus, wherein said printer comprises:

a print unit arranged to execute a printing process based on the print information received from said print information transfer unit, the print information being provided such that said print unit can execute the printing process irrespective of presence or absence of a user's print instruction, and wherein said video or audio output apparatus comprises:

an output unit arranged to execute a video or audio output process based on the video or audio data received from said video or audio data transfer unit.

6. An output apparatus comprising:

a print data transfer unit arranged to read, from a storage medium which stores (a) at least one piece of print data each having a print ID and (b) video or audio data, the at least one piece of print data and to execute a data transfer process to transfer the at least one piece of print data to a printer;

a transfer discriminator arranged to discriminate whether said print data transfer unit has completed the data transfer process;

a data read unit arranged to read the video or audio data from the storage medium, if said transfer discriminator discriminates that said data transfer unit has completed the data transfer process;

an ID detection unit arranged to detect a print ID in the video or audio data read by said data read unit;

an ID transfer unit arranged to transfer the print ID, if said ID detection unit detects the print ID in the read video or audio data; and a video or audio data transfer unit arranged to transfer the video or audio data read by said data read unit to a video or audio output apparatus.

7. An output apparatus according to claim 6, further comprising the printer, wherein said printer comprises:

a memory unit arranged to store the at least one piece of print data received from said print data transfer unit; and a print unit arranged to execute a printing process based on one of the at least one piece of print data stored in said memory unit, the one piece of print data having a print ID corresponding to the print ID received from said ID transfer unit.

8. An output apparatus according to claim 6, further comprising the printer, wherein said printer comprises:

a memory unit arranged to store the at least one piece of print data received from said print data transfer unit such that the print data is managed for each print ID; and a print unit arranged to execute a printing process based on one of the at least one piece of print data stored in said memory unit, the one piece of print data having a print ID corresponding to the print ID received from said ID transfer unit.

9. An output apparatus according to claim 6, wherein the at least one piece of print data is stored in the leader section of the storage medium.

10. An output apparatus according to claim 6, wherein the at least one piece of print data is provided in a compressed form and expanded and printed based on the print ID received from said ID transfer unit.

11. An output apparatus comprising:

a data read unit arranged to read video or audio data from a storage medium;

a print information detection unit arranged to detect print information in the video or audio data read by said data read unit;

a print information transfer unit arranged to transfer the print information to a printer, if said print information detection unit detects the print information in the read video or audio data; and a video or audio data transfer unit arranged to transfer the video or audio data read by said data read unit to a video or audio output apparatus, wherein the print information is provided such that the printer can execute a printing process based on the print information irrespective of presence or absence of a user's print instruction.

12. An output apparatus according to claim 11, further comprising the printer, wherein said printer comprises:

a print unit arranged to execute the printing process based on the print information received from said print information transfer unit.

13. An output method comprising:

a print data transfer step of reading, from a storage medium which stores (a) at least one piece of print data each having a print ID and (b) video or audio data, the at least one piece of print data and executing a data transfer process to transfer the at least one piece of print data to a printer;

a transfer discrimination step of discriminating whether said print data transfer step has completed the data transfer process;

a data read step of reading the video or audio data from the storage medium, if said transfer discrimination step discriminates that said data transfer step has completed the data transfer process;

an Id detection step of detecting a print ID in the video or audio data read by said data read step;

an ID transfer step of transferring the print ID, if said ID detection step detects the print ID in the read video or audio data; and a video or audio data transfer step of transferring the video or audio data read by said data read step to a video or audio output apparatus.

14. An output method according to claim 13, further comprising:

a storing step of storing the at least one piece of print data transferred in said print data transfer step in a memory; and a print step of executing a printing process based on one of the at least one piece of print data stored in the memory, the one piece of print data having a print ID corresponding to the print ID transferred in said ID transfer step.

15. An output method according to claim 13, further comprising:

a storing step of storing the at least one piece of print data transferred in said print data transfer step in a memory such that the print data is managed for each print ID; and a print step of executing a printing process based on one of the at least one piece of print data stored in the memory, the one piece of print data having a print ID corresponding to the print ID transferred in said ID transfer step.

16. An output method according to claim 13, wherein the at least one piece of print data is stored in the leader section of the storage medium.

17. An output method according to claim 13, wherein the at least one piece of print data is provided in a compressed form and expanded and printed based on the print ID transferred in said ID transfer step.

18. An output method comprising:

a data read step of reading video or audio data from a storage medium;

a print information detection step of detecting print information in the video or audio data read by said data read step;

a print information transfer step of transferring the print information to a printer, if said print information detection step detects the print information is included in the read video or audio data; and a video or audio data transfer step of transferring the video or audio data read by said data read step to a video or audio output apparatus, wherein the print information is provided such that the printer can execute a printing process based on the print information irrespective of presence or absence of a user's print instruction.

19. An output method according to claim 18, further comprising a print step of executing the printing process based on the print information transferred in said print information transfer step.

20. A memory medium storing a program for causing a computer to control an output method comprising:

a print data transfer step of reading, from a storage medium which stores (a) at least one piece of print data each having a print ID and (b) video or audio data, the at least one piece of print data and executing a data transfer process to transfer the at least one piece of print data to a printer;

a transfer discrimination step of discriminating whether said print data transfer step has completed the data transfer process;

an ID discrimination step of reading the video or audio data from the storage medium and discriminating whether a print ID is included in the read video or audio data, if said transfer discrimination step discriminates that said data transfer step has completed the data transfer process;

an ID transfer step of transferring the print ID included in the video or audio data to the printer, if said ID discrimination step discriminates that the print ID is included in the read video or audio data; and a video or audio data transfer step of transferring the read video or audio data to a video or audio output apparatus, if said ID discrimination step discriminates that no print ID is included in the read video or audio data.

21. A memory medium according to claim 20, further comprising:

a storing step of storing the at least one piece of print data transferred in said print data transfer step in a memory; and a print step of executing a printing process based on one of the at least one piece of print data stored in the memory, the one piece of print data having a print ID corresponding to the print ID transferred in said ID transfer step.

22. A memory medium according to claim 20, further comprising:

a storing step of storing the at least one piece of print data transferred in said print data transfer step in a memory such that the print data is managed for each print ID; and a print step of executing a printing process based on one of the at least one piece of print data stored in the memory, the one piece of print data having a print ID corresponding to the print ID transferred in said ID transfer step.

23. A memory medium according to claim 20, wherein the at least one piece of print data is stored in the leader section of the storage medium.

24. A memory medium according to claim 20, wherein the at least one piece of print data is provided in a compressed form and expanded and printed based on the print ID transferred in said ID transfer step.

25. A memory medium storing a program for causing a computer to control an output method comprising:

a print information discrimination step of reading video or audio data from a storage medium and discriminating whether print information is included in the read video or audio data;

a print information transfer step of transferring the print information included in the video or audio data to a printer, if said print information discrimination step discriminates that the print information is included in the read video or audio data; and a video or audio data transfer step of transferring the read video or audio data to a video or audio output apparatus, if said print information discrimination step discriminates that no print information is included in the read video or audio data, wherein the print information is provided such that the printer can execute a printing process based on the print information irrespective of presence or absence of a user's print instruction.

26. A memory medium according to claim 18, further comprising a print step of executing the printing process based on the print information transferred in said print information transfer step.

27. A computer program product embodying a program for implementing an output method comprising:

program code for a print data transfer step of reading, from a storage medium which stores (a) at least one piece of print data each having a print ID and (b) video or audio data, the at least one piece of print data and executing a data transfer process to transfer the at least one piece of print data to a printer;

program code for a transfer discrimination step of discriminating whether said print data transfer step has completed the data transfer process;

program code for an ID discrimination step of reading the video or audio data from the storage medium and discriminating whether a print ID is included in the read video or audio data, if said transfer discrimination step discriminates that said data transfer step has completed the data transfer process;

program code for an ID transfer step of transferring the print ID included in the video or audio data to the printer, if said ID discrimination step discriminates that the print ID is included in the read video or audio data; and program code for a video or audio data transfer step of transferring the read video or audio data to a video or audio output apparatus, if said ID discrimination step discriminates that no print ID is included in the read video or audio data.

28. A program product according to claim 27, further comprising:

program code for a storing step of storing the at least one piece of print data transferred in said print data transfer step in a memory; and program code for a print step of executing a printing process based on one of the at least one piece of print data stored in the memory, the one piece of print data having a print ID corresponding to the print ID transferred in said ID transfer step.

29. A program product according to claim 27, further comprising:

program code for a storing step of storing the at least one piece of print data transferred in said print data transfer step in a memory such that the print data is managed for each print ID; and program code for a print step of executing a printing process based on one of the at least one piece of print data stored in the memory, the one piece of print data having a print ID corresponding to the print ID transferred in said ID transfer step.

30. A program product according to claim 27, wherein the at least one piece of print data is stored in the leader section of the storage medium.

31. A program product according to claim 27, wherein the at least one piece of print data is provided in a compressed form and expanded and printed based on the print ID transferred in said ID transfer step.

32. A computer program product embodying a program for implementing an output method comprising:

program code for a print information discrimination step of reading video or audio data from a storage medium and discriminating whether print information is included in the read video or audio data;

program code for a print information transfer step of transferring the print information included in the video or audio data to a printer, if said print information discrimination step discriminates that the print information is included in the read video or audio data; and program code for a video or audio data transfer step of transferring the read video or audio data to a video or audio output apparatus, if said print information discrimination step discriminates that no print information is included in the read video or audio data, wherein the print information is provided such that the printer can execute a printing process based on the print information irrespective of presence or absence of a user's print instruction.

33. A program product according to claim 32, further comprising program code for a print step of executing the printing process based on the print information transferred in said print information transfer step.

* * * * *